(12) United States Patent
Van Gestel et al.

(10) Patent No.: US 7,865,068 B2
(45) Date of Patent: Jan. 4, 2011

(54) DEVICE AND METHOD FOR RECORDING INFORMATION

(75) Inventors: Wilhelmus Jacobus Van Gestel, Eindhoven (NL); Declan Patrick Kelly, Eindhoven (NL); Philip Steven Newton, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1426 days.

(21) Appl. No.: 10/554,226

(22) PCT Filed: Apr. 27, 2004

(86) PCT No.: PCT/IB2004/050519

§ 371 (c)(1),
(2), (4) Date: Oct. 25, 2005

(87) PCT Pub. No.: WO2004/098186

PCT Pub. Date: Nov. 11, 2004

(65) Prior Publication Data

US 2006/0222332 A1 Oct. 5, 2006

(30) Foreign Application Priority Data

Apr. 29, 2003 (EP) .................................. 03101170

(51) Int. Cl.
*H04N 5/84* (2006.01)
*H04N 5/45* (2006.01)
*H04N 5/50* (2006.01)
*H04N 5/222* (2006.01)
*H04N 5/445* (2006.01)
*H04N 7/10* (2006.01)
*H04N 7/173* (2006.01)
*G06F 3/00* (2006.01)
*G06T 13/00* (2006.01)

(52) U.S. Cl. ................. 386/332; 345/473; 348/563; 348/564; 348/565; 348/569; 348/722; 715/716; 715/743; 719/310; 725/32; 725/41; 725/42; 725/117; 725/126; 725/132

(58) Field of Classification Search ............... 386/95; 345/473; 348/563, 564, 565, 569, 722, E5.006, 348/E5.101, E5.104, E5.105, E5.108, E5.112, 348/E7.024, E7.071; 375/E7.222, E7.272; 715/716, 743; 725/32, 41, 42, 117, 126, 725/132; 707/E17.058; 719/310
See application file for complete search history.

(56) References Cited

U.S. PATENT DOCUMENTS 5,544,163 A 8/1996 Madonna (Continued)

FOREIGN PATENT DOCUMENTS

RU 2154346 C2 8/2000

(Continued)

*Primary Examiner*—Thai Tran
*Assistant Examiner*—Syed Y Hasan

(57) ABSTRACT

A device for recording records digitally encoded video information on a record carrier according to a predefined recording format, such as BD. The device has an input unit (91) for receiving a data stream comprising the video information and application data objects contained in messages, such as DVB-MHP. The device has a message unit (92, 94) for extracting the messages from the data stream. The messages are stored in a message file as a series of the messages for the program separate from the video information. The device also has a parsing unit (95) for generating application control information that includes accessing information for accessing the messages in the message file. The application control information is stored in a message info file.

10 Claims, 7 Drawing Sheets

U.S. PATENT DOCUMENTS

Figure 3:
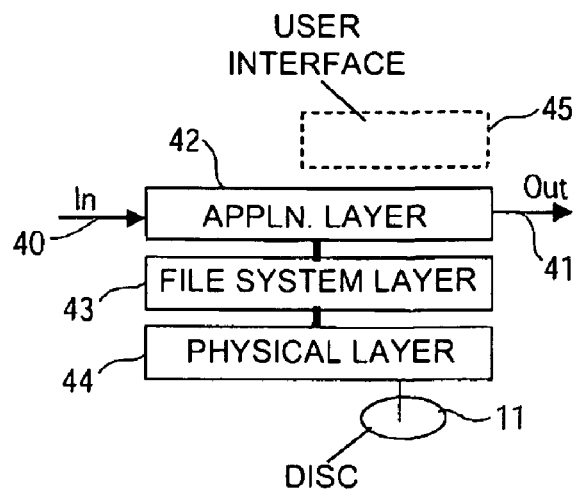

| | | | |
|---|---|---|---|
| 5,734,589 A * | 3/1998 | Kostreski et al. | 715/716 |
| 5,969,770 A * | 10/1999 | Horton | 348/569 |
| 7,427,988 B2 * | 9/2008 | Vienneau et al. | 345/473 |
| 2002/0083210 A1 * | 6/2002 | Harrison et al. | 709/310 |
| 2003/0236918 A1 * | 12/2003 | Manor et al. | 709/250 |
| 2005/0015803 A1 * | 1/2005 | Macrae et al. | 725/41 |

FOREIGN PATENT DOCUMENTS

| | | |
|---|---|---|
| RU | 2196389 C2 | 1/2003 |
| WO | 1995024788 A2 | 9/1995 |
| WO | 0133852 A1 | 5/2001 |
| WO | 0169927 A1 | 9/2001 |

* cited by examiner

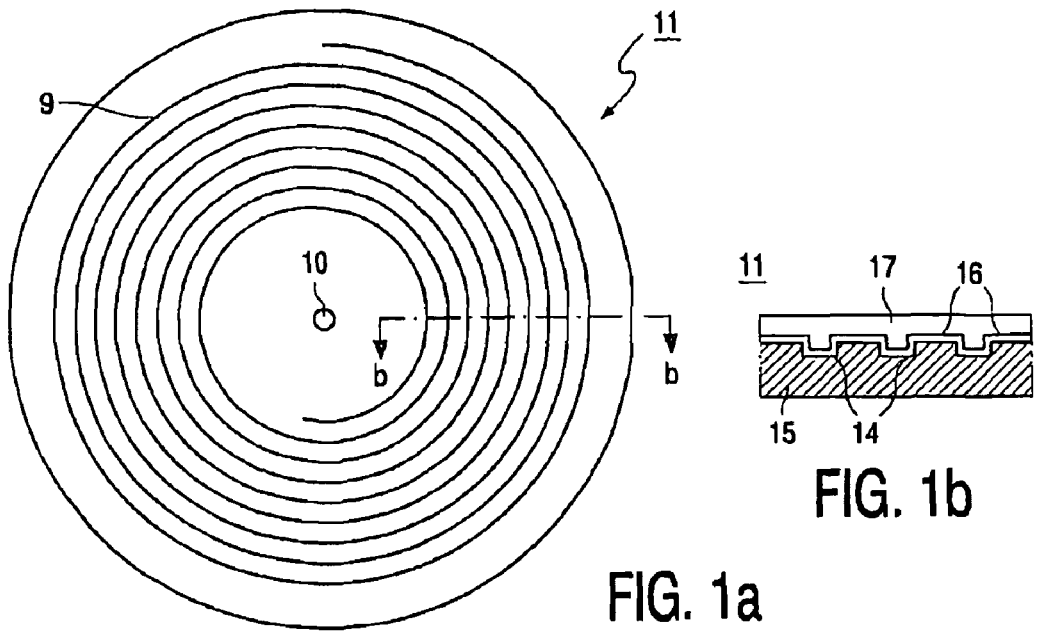
FIG. 1b
FIG. 1a
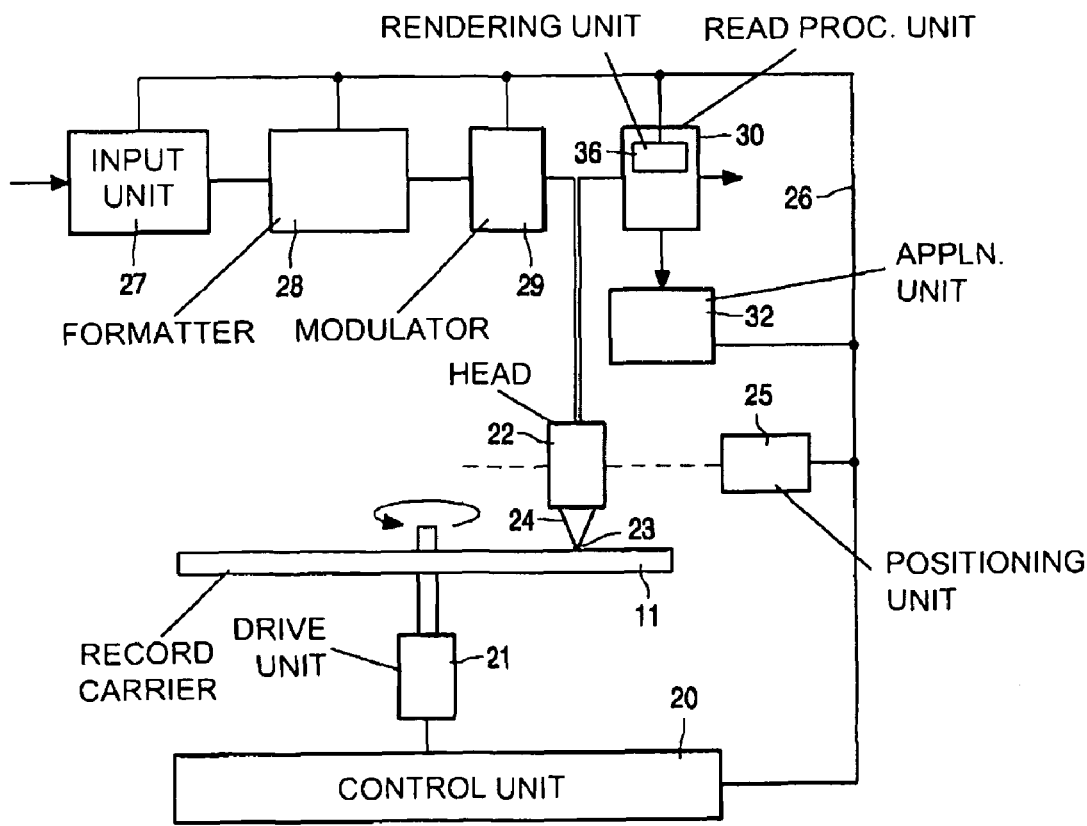
FIG. 2

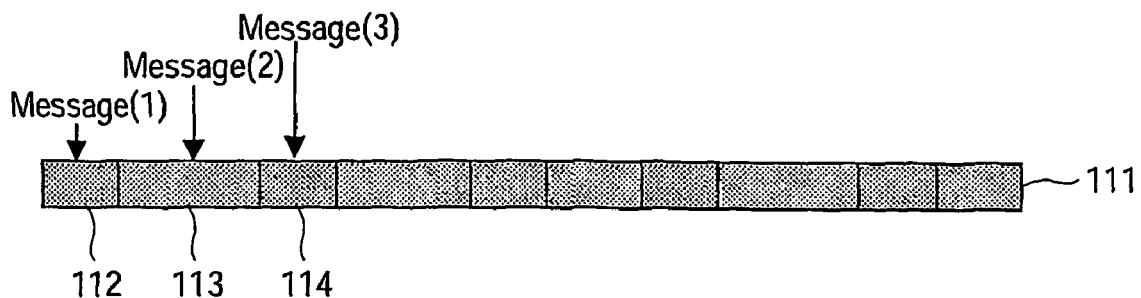

FIG.11

```
MHP -Info()
    General-Info.
        Name of the Application.
        Required referenced data.
        Valid period of this application.
        Corresponding MHP-Appl file.
        Number of carousels.
    Carousel-1:
        Number of object entries
        First message (object) to be read (optional)
        Entry-1:
            Message (object) number in the MHP-App file
            Kind of message (object).
            Start location in the MHP-App file [byte accurate]
            Length of the message (in bytes)
            Start active period (presentation time of the program)
            End active period (presentation time of the program).
            Succeeded by message number x.
        Entry-2:
            Message (object) number in the MHP-App file
            Kind of message (object).
            a.s.o Carousel-2:
        Number of object entries
        a.s.o
```

FIG.12

DEVICE AND METHOD FOR RECORDING INFORMATION

The invention relates to a device for recording information

The invention further relates to a device for reading information from a record carrier.

The invention further relates to a record carrier.

The invention further relates to a method of recording information.

The invention further relates to a computer program product for recording information.

A device and method for recording information on a record carrier are the known from WO01/33852, in which digitally compressed video data is recorded on a record carrier according to a video encoding standard, for example the MPEG2 format. A data stream includes video and pushed interactive data (i.e. delivered to users whether or not they request such data) together constituting an enhanced user program that provides a video program and interactive functions or data to the user, such as quiz response options or live stock quotes. The data stream is broadcast to a receiving device and includes one or more application data objects representing the pushed interactive data. The application data objects may include various types of objects, including a file table, for providing a number of interactive applications to the user while rendering the video data. When the data stream is received the individual data objects are extracted from the data steam. Then the data objects, accompanying object properties and the file table are stored. Hence the pushed interactive data is converted into pulled interactive data, i.e. the application is under the control of the user. It is noted that storing the data stream as a whole, i.e. just as it is received, would have a number of disadvantages. For example, when starting rendering the program at a randomly chosen moment, any interactive application will only be available after waiting until it has been (re-)included in the data stream. Hence the data objects are stored separately as files and can be accessed by the user at any time. However, storing of the data objects as files requires a predetermined file format and file accessing system suitable for every application, while file table information has to be included in the data stream.

It is an object of the invention to provide a system for recording and reproducing an enhanced user program comprising digitally encoded real-time information and interactive applications, which is able to store the video and interactive applications included in a data stream via versatile storage format, which is compatible with pre-existing recording and playback devices operating according to a predefined recording format.

According to a first aspect of the invention a device for recording information on a record carrier comprises recording means for recording marks representing digitally encoded real-time information, in particular video, according to a predefined recording format, an input unit for receiving a data stream constituting an enhanced user program, the data stream comprising the real-time information and application data objects, at least one subset of the application data objects constituting data for providing to a user at least one interactive application while rendering the real-time information, message means for extracting messages from the data stream, the messages containing the application data objects, parsing means for generating application control information, and control means for storing the messages in a message file separate from the real-time information as a series of the messages for the program and for storing the application control information in a message info file, the application control information including accessing information for accessing the messages in the message file.

According to a second aspect of the invention a device for reading information from a record carrier for rendering an enhanced user program comprises reading means for reading marks representing digitally encoded real-time information, in particular video, according to a predefined recording format, and control means for providing to a user at least one interactive application based on at least one subset of application data objects while rendering the real-time information by retrieving application control information from a message info file, and by retrieving messages from a message file based on accessing information included in the application control information, the messages containing the application data objects, and the message file being stored separate from the real-time information.

According to a third aspect of the invention a non-transitory record carrier carries information for constituting an enhanced user program, on which non-transitory record carrier, marks in a track represent digitally encoded real-time information, in particular video, according to a predefined recording format, a message file separate from the real-time information, the message file comprising messages containing application data objects, at least one subset of the application data objects constituting data for providing to a user at least one interactive application while rendering the real-time information, and a message info file containing application control information including accessing information for accessing the messages in the message file.

The measures have the effects that application data objects are stored in a separate message file. The message info file has accessing information for retrieving the individual application data objects from the message file. The message info file is generated by using the information from the data stream as provided for immediate rendering. The message file and message info file are directly available to the rendering device for use when deferred rendering and interactive functions are required.

This has the advantage that a storage and retrieval system for application data is provided that is independent of file information included by the transmitter in the data stream. A large number of different interactive applications can be accommodated and randomly accessed using just the message file and the message info file.

The invention is also based on the following recognition. The inventors have seen that parsing the data stream and extracting data objects to store files for each interactive application requires the receiver to retrieve detailed information from the data stream. Providing a message storage system that consecutively stores the messages and generates accessing information for quickly navigating through the messages is based on the same information that is needed for immediate reproduction. Hence the storage system based on messages as transmitted is less complicated and more versatile than the storage system based on application files of WO 01/33852. In that system the receiver is configured to parse the pushed data into separate data objects which make up the data stream of the program, and store the data objects on a storage device as a set of files rather than as a series of messages.

In an embodiment of the device the parsing means are arranged for including for a message at least one of the following in the message info file: a message number, the message number identifying the message in the series of the messages; a message type indicator; a start location in the message file; length of the message; number of succeeding message. This has the advantage that any message is easily retrievable from the message file using the message info file.

In an embodiment of the device the message means are arranged for removing redundant information from the messages extracted by the parsing unit. This has the advantage that the amount of information to be stored is reduced.

Further preferred embodiments of the recording or reading device, the record carrier, and method according to the invention are given in the claims.

Figure 4:
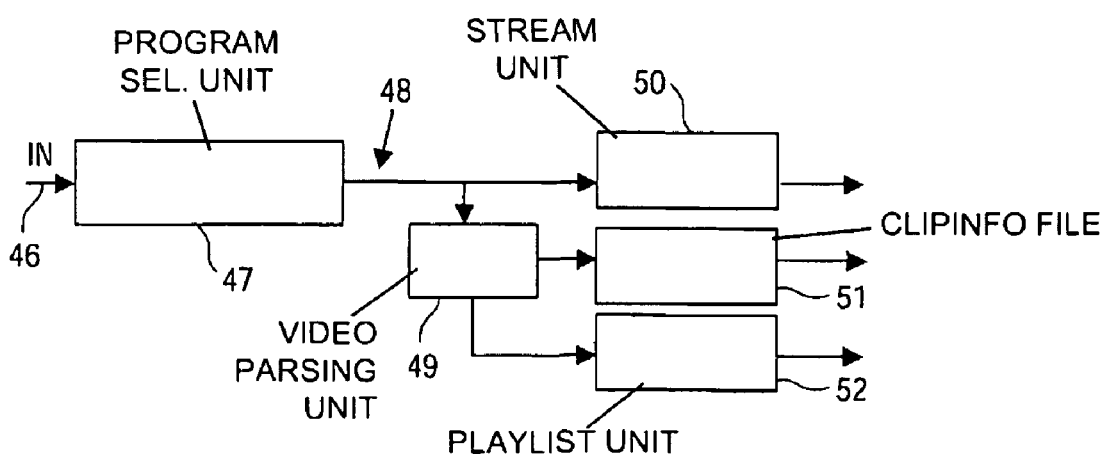
Figure 5:
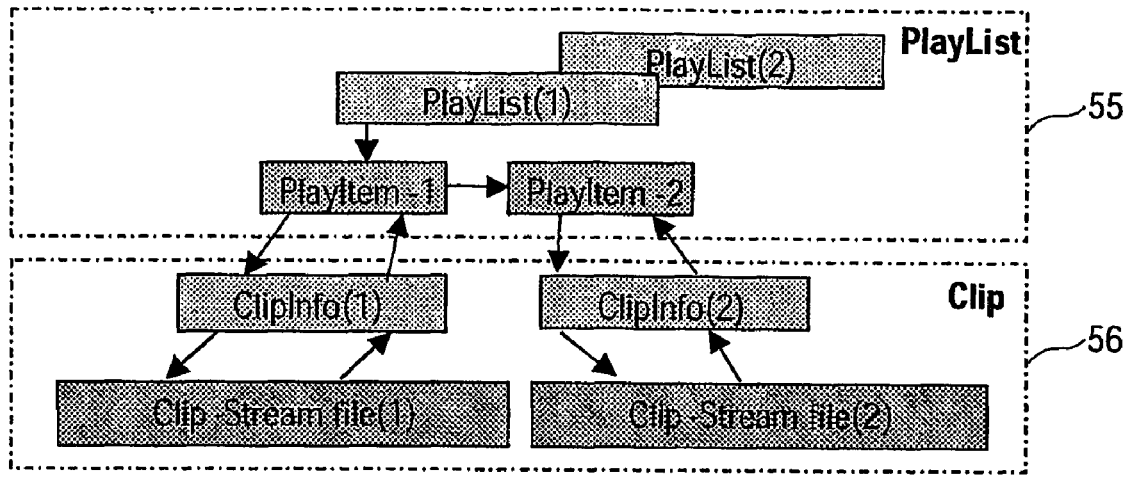
Figure 6:
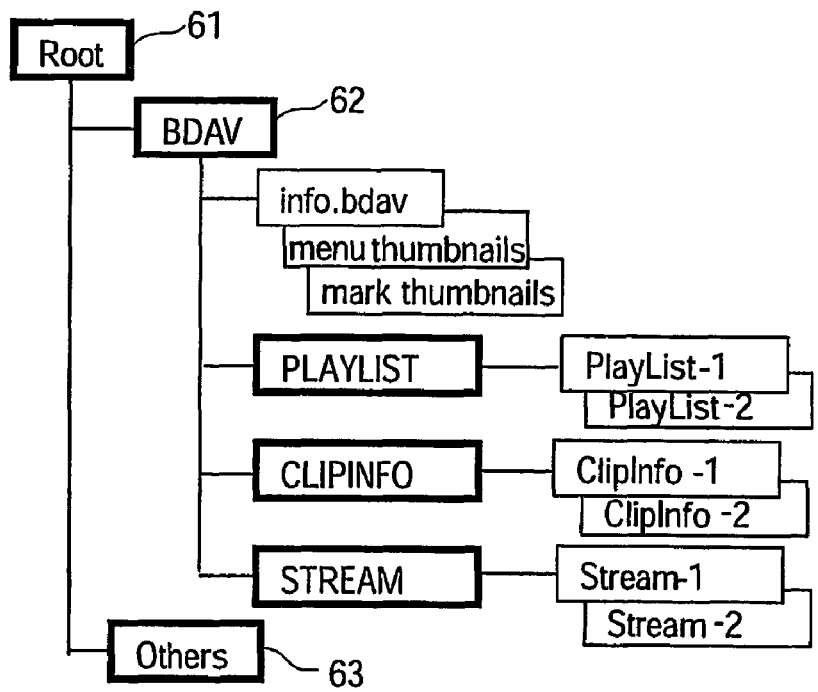
Figure 7:
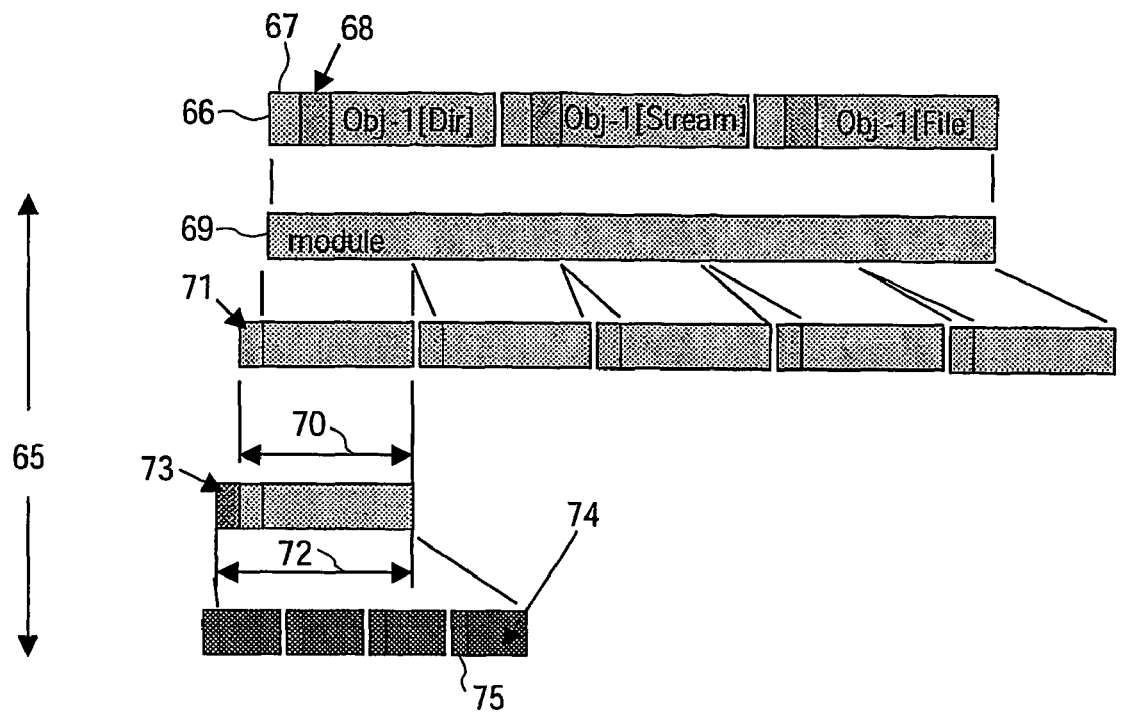
Figure 8:
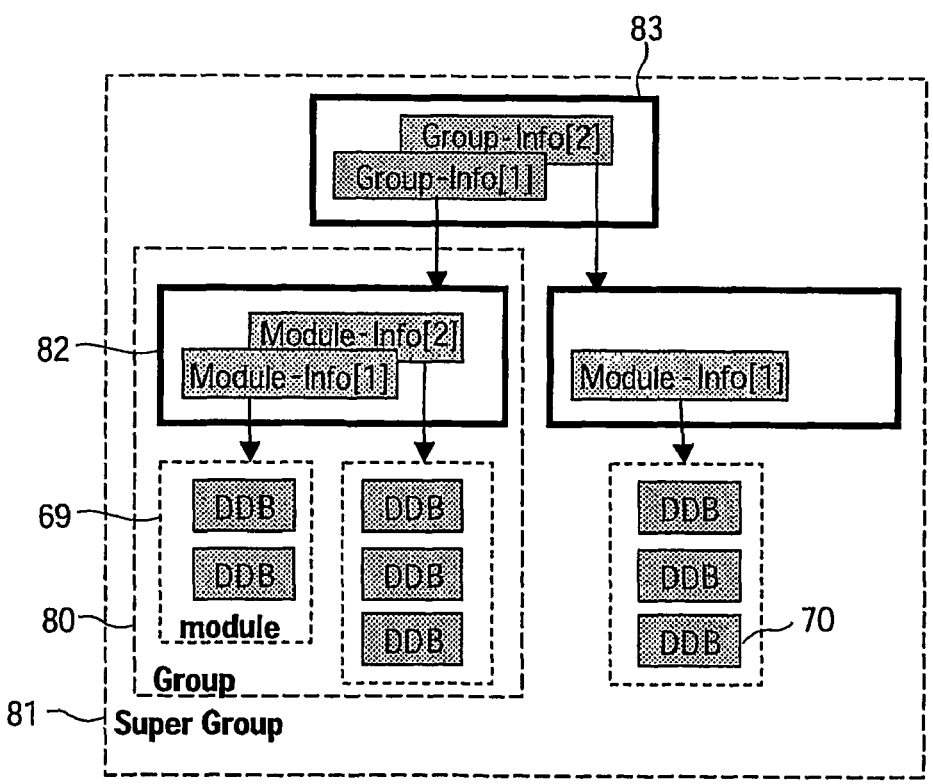
Figure 9:
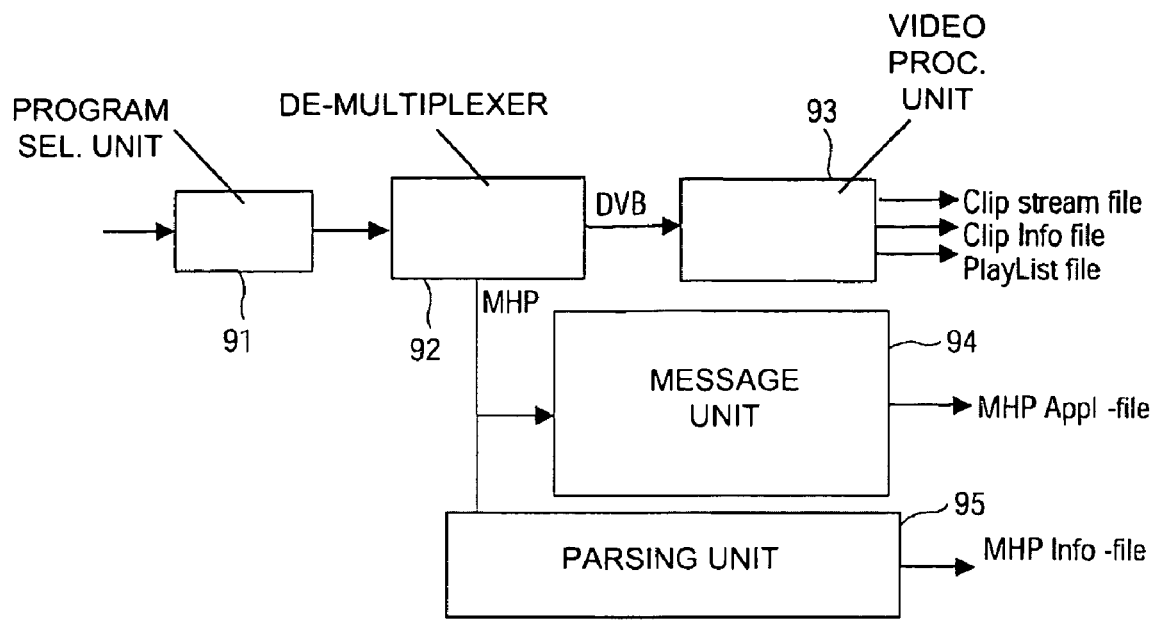
Figure 10:
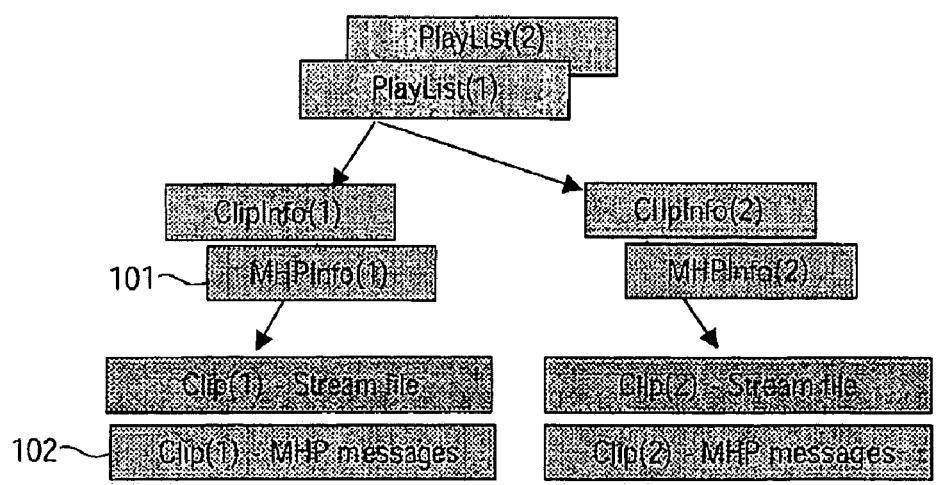
Figure 13:
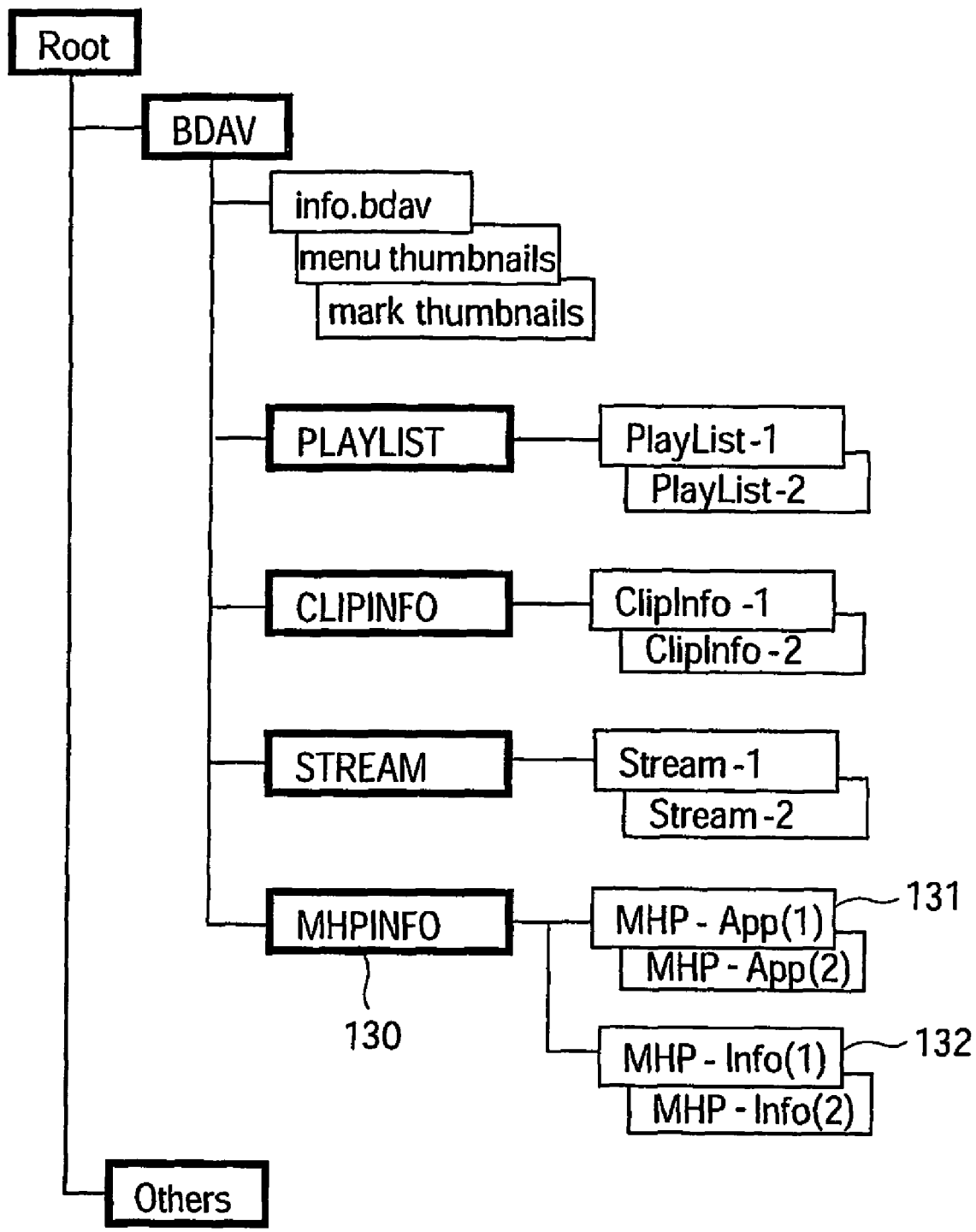

These and other aspects of the invention will be apparent from and elucidated further with reference to the embodiments described by way of example in the following description and with reference to the accompanying drawings, in which FIG. 1a shows a record carrier (top view), FIG. 1b shows a record carrier (cross section), FIG. 2 shows a recording and/or reading device, FIG. 3 shows a block diagram of the layers during BD recording, FIG. 4 shows recording of video according to the BD recording format, FIG. 5 shows the structure of the application layer, FIG. 6 shows a directory structure for the BD system, FIG. 7 shows the transmission format for messages of MHP data in a MPEG-TS, FIG. 8 shows a structure of groups for a carousel, FIG. 9 shows processing of a data stream to extract messages and message info, FIG. 10 shows a structure of the application layer when storing MHP data, FIG. 11 shows the layout of a message file, FIG. 12 shows an example of a message info file, and FIG. 13 shows a directory structure for MHP data.

Corresponding elements in different Figures have identical reference numerals.

FIG. 1a shows a disc-shaped record carrier 11 having a track 9 and a central hole 10. The track 9, being the position of the series of (to be) recorded marks representing information, is arranged in accordance with a spiral pattern of turns constituting substantially parallel tracks on an information layer. The record carrier may be optically readable, called an optical disc, and has an information layer of a recordable type. Examples of a recordable disc are the CD-R and CD-RW, and writable versions of DVD, such as DVD+RW, and the high density writable optical disc using blue lasers, called Blue-ray Disc (BD). The information is represented on the information layer by recording optically detectable marks along the track, e.g. crystaline or amorphous marks in phase change material. The track 9 on the recordable type of record carrier is indicated by a pre-embossed track structure provided during manufacture of the blank record carrier. The track structure is constituted, for example, by a pregroove 14 which enables a read/write head to follow the track during scanning. The track structure comprises position information, e.g. addresses, for indication the location of units of information, usually called information blocks.

FIG. 1b is a cross-section taken along the line b-b of the record carrier 11 of the recordable type, in which a transparent substrate 15 is provided with a recording layer 16 and a protective layer 17. The protective layer 17 may comprise a further substrate layer, for example as in DVD where the recording layer is at a 0.6 mm substrate and a further substrate of 0.6 mm is bonded to the back side thereof. The pregroove 14 may be implemented as an indentation or an elevation of the substrate 15 material, or as a material property deviating from its surroundings.

The record carrier 11 is intended for carrying information representing digitally encoded video like MPEG2 encoded video information recorded according to a predefined recording format like the DVD format. Further details about the DVD disc can be found in reference: *ECMA-267: 120 mm DVD—Read-Only Disc*—(1997), and corresponding DVD video recording specifications. The BD recording format is described in the System Description Blue-Ray Disc Rewritable Format, in particular Part 3: Audio Visual Specifications, version 1.0, June 2002. Relevant aspects are described below with reference to FIGS. 3 and 4. Broadcasting and transporting multimedia data for a home platform is described in the standardization document ETSI TS 101.812, further referred to as MHP, whereas relevant aspects are described below with reference to Figures XXX.

FIG. 2 shows a recording and/or reading device for writing information on a record carrier 11 of a type which is writable or re-writable, for example CD-R or CD-RW, or DVD+RW or BD. The device is provided with recording means for scanning the track on the record carrier which means include a drive unit 21 for rotating the record carrier 11, a head 22, a positioning unit 25 for coarsely positioning the head 22 in the radial direction on the track, and a control unit 20. The head 22 comprises an optical system of a known type for generating a radiation beam 24 guided through optical elements focused to a radiation spot 23 on a track of the information layer of the record carrier. The radiation beam 24 is generated by a radiation source, e.g. a laser diode. The head further comprises (not shown) a focusing actuator for moving the focus of the radiation beam 24 along the optical axis of said beam and a tracking actuator for fine positioning of the spot 23 in a radial direction on the center of the track. The tracking actuator may comprise coils for radially moving an optical element or may alternatively be arranged for changing the angle of a reflecting element. For writing information the radiation is controlled to create optically detectable marks in the recording layer. The marks may be in any optically readable form, e.g. in the form of areas with a reflection coefficient different from their surroundings, obtained when recording in materials such as dye, alloy or phase change material, or in the form of areas with a direction of magnetization different from their surroundings, obtained when recording in magneto-optical material. For reading the radiation reflected by the information layer is detected by a detector of a usual type, e.g. a four-quadrant diode, in the head 22 for generating a read signal and further detector signals including a tracking error and a focusing error signal for controlling said tracking and focusing actuators. The read signal is processed by read processing unit 30 of a usual type including a demodulator, deformatter and output unit to retrieve the information. Hence retrieving means for reading information include the drive unit 21, the head 22, the positioning unit 25 and the read processing unit 30. The device may include a rendering unit 36 coupled to the read processing unit 30 for rendering real-time information, for example a display screen for rendering video information.

The device comprises write processing means for processing the input information to generate a write signal to drive the head 22, which means comprise an input unit 27, and a formatter 28 and a modulator 29. The control unit 20 controls the recording and retrieving of information and may be arranged for receiving commands from a user or from a host computer. The control unit 20 is connected via control lines 26, e.g. a system bus, to said input unit 27, formatter 28 and modulator 29, to the read processing unit 30, and to the drive unit 21, and the positioning unit 25. The control unit 20 comprises control circuitry, for example a microprocessor, a program memory and control gates, for performing the procedures and functions according to the invention as described below. The control unit 20 may also be implemented as a state machine in logic circuits.

The input unit 27 receives and processes a data stream containing at least one program of audio and/or video, for example a transport stream of a digital broadcast network such as MHP for constituting an enhanced user program. The data stream comprises the real-time program information and application data objects, for example transmitted in a carousel as explained below with reference to FIGS. 7 and 8. A subset of the application data objects, usually called a module, constitutes data for providing to a user at least one interactive application while rendering the real-time information. The data stream of a selected program is passed to the formatter 28 for generating control data and formatting the data as described below with reference to FIG. 9. For computer applications information may be interfaced to the formatter 28 directly. The formatted data from the output of the formatter 28 is passed to the modulation unit 29, which comprises for example a channel coder, for generating a modulated signal which drives the head 22. Further the modulation unit 29 comprises synchronizing means for including synchronizing patterns in the modulated signal. The formatted information presented to the input of the modulation unit 29 comprise address information and is written to corresponding addressable locations on the record carrier under the control of control unit 20 according to a predefined recording format. It is to be noted that further in the text reference is made to the predefined recording format of the BD as an example of such a format. However other predefined recording formats such as DVD+RW may be used also.

The device is provided with an application unit 32 for retrieving the application data objects and application control data under control of the control unit 20 from files as described below. The application is presented to the user in combination with the real-time information retrieved via the read unit 30.

It is noted that the device as shown in FIG. 2 has recording and reproducing functions. Alternatively a reading device for playback only has corresponding elements for retrieving information from a record carrier, and contains the scanning elements and the read processing circuitry, but does not have the input unit 27, the formatter 28, and the modulator 29.

Recording of Transport Streams such as MPEG Transport Streams is defined in the BD system. In the BD-RE system modes have been specified for storing MPEG2 Transport streams received from digital broadcast. During recording the stream is analyzed and characteristic data is derived and stored outside the main Transport stream. Main reason for storing this characteristic data outside the Transport stream is to provide random access to start rendering at a selected presentation time and to enable editing of PlayLists. In the known BD system the characteristic data relates to the video data itself, and no provisions are made for separate applications like MHP.

It is noted that in recording systems based on magnetic tape the data stream as a whole is recorded. For example in the DV system (now only used for camcorder applications) specifications have been made for recording MPEG2 Transport streams on DV tapes. The specification is written in:
"Specifications of Consumer Use Digital VCRs using 6.3 mm magnetic tape, Part 7: DVB Specifications of Consumer-Use Digital VCR Part 8: ATV Specifications of Consumer-Use Digital VCR"
by: HD Digital VCR Conference [Blue Book], December 1995.

For example the DVHS system is intended to be used for storing (partial) MPEG Transport streams from Digital Broadcasts. The MPEG TS is stored in the same way as it is received from the Broadcast station (streamer mode). DVHS is described in:
"D-VHS system standard" by Victor Company of Japan, July 2000.

FIG. 3 shows a block diagram of the layers during BD recording. At an input 40, there is a Transport stream, at the output 41, formatted data is available for use. A user interface 45 and further processing of the formatted data is not standardized. The Transport Stream might have been delivered over a Digital Interface or by a built-in tuner. The layers in the BD system are described in different parts of the System Description Blue-Ray Disc Rewritable Format:

a physical layer 44 is described in Part 1, where the physical characteristics of recording on the disc 11 are explained. At the interface between Physical layer and File system layer, there is a Logical address space;

a file system layer 43 is described in Part 2. In the File system layer a FS data base maps the files from an Application layer 42 on the Logical address space from the Physical layer 44. Furthermore in this layer some allocation rules are specified in order to guarantee real-time behavior;

the application layer is given in Part 3, where the processing needed for a certain applications is specified, e.g., storing MPEG2 Transport streams.

FIG. 4 shows recording of video according to the BD recording format. A data stream is applied at an input 46. In a Program Selection unit 47 a selection is carried out for selecting a certain program. TS packets from other programs are removed. The resulting stream 48 is called "Partial Transport stream". Program selection might also have taken place at the transmitter of the Digital Interface. Program selection is not needed if the Transport Stream contains only one program. To keep the proper timing of each TS packet a Time stamp is added to every remaining TS packet. The time stamp represents the arrival time of the TS packet. In this way the correct timing of the TS packets during playback can be restored. In a following stream unit 50 the Source packets with a length of 192 bytes (Transport Stream Packet+Time stamp) are packed in Units and the Units are concatenated into a Clip stream file. For a next recording a new Clip stream file is created and stored. Also coupled to the stream 48 is a video parsing unit 49 for parsing the incoming TS and deriving characteristics of the program and Transport Stream, which are stored in a Clipinfo file 51. The Clipinfo file 51 also contains a mapping from a presentation file in the program to a location in the stream file (with a so-called CPI (Characteristic Point Information) table). By definition a Clip consists of the stream file+the corresponding ClipInfo file 51. There are a number of sub-tables in the ClipInfo file 51, these are:

ClipInfo( ): General coding conditions etc.
SequenceInfo( ): Parts of the stream which do have the same time base.
ProgramInfo( ): Parts of the stream with the same program related info
CPI( ): Entry points in the stream
ClipMark( ): Location and kind of the Marks.
MakersPrivateData( ): Private data for this stream file.

A PlayList unit 52 is also coupled to the video parsing unit 49 for creating and storing a PlayList file. The PlayList consists of a number of sub-tables, these are:

User-Appl-Info( ): General Information which can be used for the UI (User Interface)

Playitems( ): The PlayList consists of a number of PlayItems.

PlayListMarks( ): Location and kind of the Marks.

MakersPrivateData( ): Private data for this stream file.

FIG. 5 shows the structure of the application layer. A PlayList level 55 contains a multitude of PlayList files. The PlayList file comprises a number of PlayItems. Each PlayItem refers to a presentation-start time and a presentation-end time in a Clip via the ClipInfo file on the Clip level 56. The location where to start reading in the ClipStream file can be found by using the ClipInfo file. A PlayList may consist of PlayItems which do belong to different Clips. In this way editing is possible without changing the AV content on the disc.

FIG. 6 shows a directory structure for the BD system. For compatibility reasons the directory structure and file naming has been standardized in Part 2/3 of the BD system. In a Root directory 61 a subdirectory BDAV 62 has been defined for containing the BD files. Further subdirectories (PLAYLIST, CLIPINFO, STREAM) contain the corresponding files. The PlayList files are stored in the PLAYLIST directory, the ClipInfo files are stored in the CLIPINF directory, and the Stream files are stored in the STREAM directory. In the Root a directory Others 63 is defined for containing further files, but these files are ignored by the BD application (v 1.0).

FIG. 7 shows the transmission format for messages of MHP data in a MPEG-TS. The way how the MHP data is packed and transmitted is known from the MHP specification. The audio visual (AV) content is transmitted in the MPEG transport stream (TS) multiplex. The additional information is transmitted in a carousel 65 which is also multiplexed in the MPEG-TS multiplex. The first transmission of an application should be finished before the application can be active. An application can be updated to a new version number. Important events are transmitted in the carousel.

In Digital Video Broadcasting (DVB-MHP) an Object Carousel is used to transmit the MHP data, Data carousels are used for DASE (Digital TV Application Software Environment) and ISDB (Integrated Service Digital Broadcast). Differences between the two are in the referencing for transmission and applications. Data carousels are simpler. Transmission of Data carousel and Object carousel is slightly different, but for the remainder of the explanation the difference is not important as storage is made independent from transmission. In this text below the MHP object carousel is used for explanation, the same technique can be used for the data carousels.

The upper diagram shows messages 66 for MHP, so-called BIOP messages (BIOP=Broadcast Inter ORB Protocol with ORB=Object Request Broker). The messages have a header 67 and a sub-header 68. In MHP applications there are messages for directory events (Obj-1[Dir]), file events (Obj-1 [File]), and stream and stream event (Obj-1[Stream]). The messages contain data and attributes of a single Object. They are broadcast in a single Module 69 (one module may contain several BIOP messages 66. The BIOP message contains:

a Message Header 67 [version and length of the message]

a Message Sub-header 68 [information about the conveyed object, such as object-type [File, stream, directory]

an object-key [unique identifier within an module]

a Message body [depends on the object-type]

During transmission the modules are sub-divided in download-data-blocks (DDB) 70, which have a same length except for the last DDB of the module. A DDB header 71 is attached to every DDB, the contents of the header is about the module-id and the data block number in the module. The DDB (header included) are transmitted in sections 72 as specified in MPEG2 described in IEC13818-1. A section header 73 is added. The section header 73 contains information about the transmission of the sections in the MPEG TS multiplex. The sections are transmitted in TS packets 74. Each TS packet 74 has a TS packet header 75, and optionally an adaptation header, a pointer field, and/or padding. The TS packets are multiplexed together with the other TS packets from the programs in the multiplex. The TS packet header 75 contains information about the transmission of the TS packets in the MPEG TS multiplex.

In the Object carousel there are also sent some BIOP Control messages. These messages are used to retrieve the modules from the MPEG-TS. In a Data carousel existing descriptors in Service Information (SI) tables are used to retrieve the modules from the Data carousel.

FIG. 8 shows a structure of groups for a carousel. A group 80 contains several modules 69. Information about the modules in included in Module-Info 82. A Super Group 81 contains several Groups. Information about the groups is included in Group-Info 83. Hence an Object or Data carousel might contain a lot of modules.

FIG. 9 shows processing of a data stream to extract messages and message info. In a program selection unit 91 TS packets from a selected program are passed to a de-multiplexer 92, while other packets from other TS streams are removed, whereby a partial TS stream results. Then the MPEG TS packets from the (DVB) program are separated from the MHP TS packets by the de-multiplexer 92 which provides DVB data to a video processing unit 93 having the functions for retrieving a Clip stream file, a Clip Info file and a PlayList file as described above with FIG. 4. The de-multiplexer 92 further provides MHP data to a message unit 94 for extracting messages from the data stream, the messages containing the application data objects, and to a parsing unit 95 for generating application control information In the parsing unit the MHP packets are parsed for collecting the relevant information in the SI descriptors. The control means 20 are arranged for storing the messages in a message file called the MHP Appl-file (separate from the real-time information as a series of the messages for the program) and for storing the application control information in a message info file called MHP Info file. The application control information includes accessing information for accessing the messages in the message file as described in detail below. The functions are included in the formatter 28, and/or in the control unit 20 as described with FIG. 2.

In an embodiment of the message unit 94 redundant information of the MHP packets is removed:

The TS packet header information is removed.

The section header information is removed.

The DDB header information is removed.

The redundant Messages are removed. Messages are redundant when they are repeatedly transmitted. For example if one of the messages in a module is updated then the whole module gets a new version, while the other messages might still be the same. If there are messages which refer to other programs which are not stored or from which the information is not available in a time shift playback then these messages should be removed, or alternative references could be created as described in WO 01/33852. The remaining messages are stored in the MHP-Appl file.

FIG. 10 shows a structure of the Application layer when storing MHP data. In addition to the items described with reference to FIG. 5 a message info file 101 called MHPInfo(1) has been stored. Further message files 102 called MHP messages have been stored corresponding to the Clip stream files.

FIG. 11 shows the layout of a message file. The message file contains a series of messages 111. A first message 112 called Message(1) is from Module (1) version (1); a second message 113 called Message(2) is from Module (3) version (1); message 114 called Message(3) is again from Module (1) version (1). Hence a number of messages together constitute a module for an application. All messages from all modules are numbered in the file and concatenated. The order in which they are stored is not important; time of arrival could be used. From the messages in the message file accessing information is stored in the MHP-Info file, for example the message number and the start and end of the active period (with reference to presentation time).

FIG. 12 shows an example of a message info file. In the file called MHP-Info a table of entries is included. The Contents of the MHP-Info file could be:

General Info with
Name of the Application.
Required referenced data.
Valid period of this application
Corresponding MHP-Appl file.
First message (object) to be read (optional)
Number of object entries.
Table with for each entry:
Message (object) number in the MHP-App file
Kind of message (object).
Start location in the MHP-App file [byte accurate]
Length of the message (in bytes)
Start active period (presentation time of the program)
End active period (presentation time of the program).
Succeeded by message number x.

The MHP-Info file offers the possibility to have random access in the program. In an embodiment of the read device the MHP-Info file is read before starting the program. At every moment (in presentation time) it is known what messages are active. It is noted that there may be more than one carousel in the MHP-Info file.

FIG. 13 shows a directory structure for MHP data. The MHP-Appl file 131 and the MHP -Info file 132 are stored on the BD disc in such a way that version-1 systems can read the Program without the MHP data by providing a new sub-directory 130, for example called MHPINFO. The preexisting version 1.0 of the BD system will ignore the contents of the MHPINFO directory. The MHP version will recognize the MHPINFO directory. The files in the MHPINFO directory are Group-4 files (as specified in Part-2). They are stored outside the LB region for Gathered files Although the invention has been explained mainly by embodiments using the BD, similar embodiments like DVD+RW having a predefined recording format are suitable for applying the storage of application-data. Further it is noted that a version of such a predefined format may standardize a specific storage location for the message file and the message info file. Also for the information carrier an optical disc has been described, but other media, such as a magneto-optical disc or magnetic tape, can be used. It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' may be represented by the same item of hardware. Further, the scope of the invention is not limited to the embodiments, and the invention lies in each and every novel feature or combination of features described above.

The invention claimed is:

1. A device for recording information on a record carrier, said device comprising:
   recording means for recording marks representing digitally encoded real-time information, including video information, encoded according to a predefined recording format;
   an input unit for receiving a data stream constituting an enhanced user program, the data stream comprising the real-time information and application data objects, at least one subset of the application data objects constituting data for providing to a user at least one interactive application while rendering the real-time information;
   message means for extracting messages from the data stream, the messages containing the application data objects;
   parsing means for generating application control information; and
   control means for storing the messages in a message file separate from the real-time information as a series of the messages for the program, and for storing the application control information in a message info file, the application control information including accessing information for accessing the messages in the message file.

2. The device as claimed in claim 1, wherein the parsing means includes, for a message, at least one of the following items as accessing information in the message info file:
   a message number, the message number identifying the message in the series of the messages;
   a message type indicator;
   a start location in the message file;
   length of the message;
   number of a succeeding message.

3. The device as claimed in claim 1, wherein the parsing means includes active period information in the message info file, said active period information including a start time and an end time with respect to a presentation time of the program.

4. The device as claimed in claim 1, wherein the message means removes redundant information from the messages extracted from the data stream.

5. The device as claimed in claim 4, wherein the message means removes, as the redundant information, header information of packets, including headers of transport stream packets or sections headers as used in compressed video data transmission (MPEG2), or download-data-block headers as used in multimedia data (MHP).

6. The device as claimed in claim 4, wherein the message means removes, as the redundant information, messages that are repeatedly transmitted, including messages repeatedly transmitted in a data carousel.

7. A device for reading information from a non-transitory record carrier for rendering an enhanced user program, said device comprising:
   reading means for reading marks representing digitally encoded real-time information, including video information, encoded according to a predefined recording format; and
   control means for providing to a user at least one interactive application based on at least one subset of application data objects while rendering the real-time information, said control means retrieving application control information from a message info file having been stored on said record carrier separate from the real-time information, and retrieving messages comprising a message header providing information. about a respective message from a series of messages for the enhanced user program from a message file, the application control information including accessing information based upon the information about the respective message provide in the message header, said control means accessing messages in the series of messages in the message file, and retrieving the messages from the series of messages from the message file based on the accessing information included in the application control information, the messages containing the application data objects, and the message file having been stored on said record carrier separate from the real-time information.

8. A non-transitory record carrier carrying information for constituting an enhanced user program, said record carrier having marks in a track representing:
  digitally encoded real-time information, including video information, encoded according to a predefined recording format,
  a message file separate from the real-time information, the message file comprising messages having a message header providing information about a respective message, stored in a series of messages, the messages containing application data objects, at least one subset of the application data objects constituting data for.providing to a user at least one interactive application while rendering the real-time information, and
  a message info file separate from the real-time information and from the message file, the message info file containing application control information including accessing information based upon the information about the respective message provided in the message header, for accessing the messages from the series of messages in the message file.

9. The non-transitory record carrier as claimed in claim 8, wherein the message info file contains, as the accessing information for a message, at least one of the following items:
  a message number, the message number identifying the message in the series of the messages;
  a message type indicator;
  a start location in the message file;
  length of the message;
  start of an active period;
  end of the active period;
  number of succeeding message.

10. A method of recording information on a record carrier, said method comprising the steps of:
  recording digitally encoded real-time information, including video information, encoded according to a predefined recording format;
  receiving a data stream constituting an enhanced user program, the data stream comprising the real-time information and application data objects, at least one subset of the application data objects constituting data for providing to a user at least one interactive application while rendering the real-time information;
  extracting messages from the data stream, the messages containing the application data objects;
  generating application control information; and
  storing the messages in a message file separate from the real-time information as a series of the messages for the program, and storing the application control information in a message info file, the application control information including accessing information for accessing the messages in the message file.

* * * * *